(12) United States Patent
Aruga

(10) Patent No.: US 9,784,975 B2
(45) Date of Patent: Oct. 10, 2017

(54) DISPLAY DEVICE AND CONTROL METHOD FOR DISPLAY DEVICE

(71) Applicant: SEIKO EPSON CORPORATION, Tokyo (JP)

(72) Inventor: Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 154 days.

(21) Appl. No.: 14/963,899

(22) Filed: Dec. 9, 2015

(65) Prior Publication Data

US 2016/0189364 A1 Jun. 30, 2016

(30) Foreign Application Priority Data

Dec. 25, 2014 (JP) .................. 2014-261553

(51) Int. Cl.
 G02B 27/01 (2006.01)
 G06F 3/01 (2006.01)
(52) U.S. Cl.
 CPC .......... G02B 27/0172 (2013.01); G06F 3/011 (2013.01); G02B 2027/014 (2013.01); G02B 2027/0127 (2013.01); G02B 2027/0138 (2013.01); G02B 2027/0178 (2013.01)
(58) Field of Classification Search
 CPC ........ G02B 27/0172; G02B 2027/0127; G02B 2027/0138; G06F 3/011
 See application file for complete search history.

(56) References Cited

U.S. PATENT DOCUMENTS

| 2015/0015460 | A1* | 1/2015 | Kobayashi | ........... G02B 27/017 345/8 |
| 2015/0062000 | A1* | 3/2015 | Saito | ..................... G02B 27/017 345/156 |
| 2015/0062165 | A1* | 3/2015 | Saito | ..................... G02B 27/017 345/633 |
| 2016/0035136 | A1* | 2/2016 | Sendai | ............... G02B 27/0172 345/633 |
| 2016/0161744 | A1* | 6/2016 | Kobayashi | ........... G02B 27/017 345/8 |

FOREIGN PATENT DOCUMENTS

JP 2006-012042 A 1/2006

* cited by examiner

*Primary Examiner* — Ricardo L Osorio

(74) *Attorney, Agent, or Firm* — Oliff PLC

(57) ABSTRACT

A display device includes an image display section that transmits an outside scene and displays an image to be visually recognizable together with the outside scene. A control section acquires depth data concerning a direction visually recognizable through the image display section and controls the image display section on the basis of the acquired depth data. According to the control, the control section changes visibility of the outside scene visually recognized through the image display section.

13 Claims, 7 Drawing Sheets

DISPLAY DEVICE AND CONTROL METHOD FOR DISPLAY DEVICE

BACKGROUND

1. Technical Field

The present invention relates to a display device and a control method for the display device.

2. Related Art

There has been known a display device that displays an image related to a real space (see, for example, JP-A-2006-12042 (Patent Literature 1)). The display device described in Patent Literature 1 displays a CG image aligned with a real world or a video of the real world. A user can observe a state in which the CG image is superimposed on any real object and a state in which the CG image is not superimposed on any real object.

The display device described in Patent Literature 1 switches display and non-display of the CG image as desired by the user. It has been desired that a device that performs display related to a real outside scene is utilized for the purpose of changing the display even if the user does not instruct the change each time and informing the user of information.

SUMMARY

An advantage of some aspects of the invention is to provide a display device that can be used for the purpose of informing a user of information by performing display related to a real outside scene and a control method for the display device.

A display device according to an aspect of the invention includes: a display section configured to transmit an outside scene and display an image to be visually recognizable together with the outside scene; and a control section configured to acquire distance information concerning a direction visually recognizable through the display section and control the display section on the basis of the acquired distance information to change visibility of the outside scene visually recognized through the display section.

According to the aspect, a user can obtain information concerning a distance on the basis of appearance of the outside scene transmitted through the display section. Therefore, it is possible to efficiently provide the user with the information concerning the distance. Since the control of the display section is performed on the basis of the distance information, for example, it is possible to reduce the number of times of operation by the user. It is possible to attain improvement of convenience.

In the display device according to the aspect, the display section may display an image in a display range formed by a plurality of display regions, the distance information may include information corresponding to the respective display regions in the display range, and the control section may control display forms of the respective display regions on the basis of association of the distance information and the display regions to thereby change visibility of the outside scene.

According to the aspect with this configuration, it is possible to provide the information concerning the distance by changing the visibility of the outside scene in units of the respective display regions. Further, it is possible to partially change the visibility of the outside scene with reference to the distance.

In the display device according to the aspect, the display device may include a plurality of image pickup sections, and the control section may acquire the distance information based on picked-up images of the plurality of image pickup sections and performs association of the acquired distance information and the display regions.

According to the aspect with this configuration, it is possible to quickly perform the association of the distance information and the display regions. It is possible to easily and quickly execute processing for changing the visibility of the outside scene.

In the display device according to the aspect, the display device may include a distance detecting section configured to detect a distance to a target object located in a direction visually recognizable through the display section and output the distance information, and the control section may acquire the distance information output by the distance detecting section.

According to the aspect with this configuration, it is possible to detect a distance to an object seen as the outside scene and change the visibility of the outside scene according to the distance.

In the display device according to the aspect, the distance detecting section may include: a plurality of image pickup sections; and a distance-information generating section configured to generate the distance information on the basis of picked-up image data of the plurality of image pickup sections and output the distance information.

According to the aspect with this configuration, it is possible to quickly generate the distance information using picked-up images.

In the display device according to the aspect, the control section may reduce the visibility of the outside scene by changing, in the display section, luminance of display in a position corresponding to the direction in which the distance information is acquired.

According to the aspect with this configuration, it is possible to easily change the visibility of the outside scene.

In the display device according to the aspect, the control section may perform mask processing for reducing visibility of apart of the outside scene visually recognizable through the display section to be lower than visibility of other portions.

According to the aspect with this configuration, it is possible to make an object present at a specific distance less visible or make the object conspicuous by reducing the visibility of a part of the outside scene on the basis of the distance information.

In the display device according to the aspect, the control section may change a display color or a display gradation in the display regions of the display section in the mask processing.

According to the aspect with this configuration, it is possible to easily and finely adjust the visibility of the outside scene.

In the display device according to the aspect, the control section may change, on the basis of the distance information, visibility of a portion corresponding to a distance set in advance in the outside scene.

According to the aspect with this configuration, it is possible to change visibility of an object present at a specific distance in the outside scene and draw attention of the user to the object or a portion other than the object.

In the display device according to the aspect, the control section may change visibility of a portion where a distance specified by the distance information changes in the outside scene.

According to the aspect with this configuration, it is possible to change visibility of an object, a distance to which changes in the outside scene, to make the object conspicuous and provide the user with information concerning the change in the distance.

In the display device according to the aspect, the display device may include a main body of a head wearing type worn on the head of the user, and the display section may be provided in the main body.

According to the aspect with this configuration, the display device worn on the head of the user to display an image can change the visibility of the outside scene on the basis of the distance information and efficiently provide the user with the information concerning the distance.

A display device according to another aspect of the invention includes: a display section configured to transmit an outside scene and display an image in a display range to be visually recognizable together with the outside scene; and a control section configured to control the display of the display section. The control section acquires distance information concerning a direction visually recognizable through the display section and association information for associating a plurality of display regions included in the display range and the distance information and causes, on the basis of the association information, the display section to display a display color corresponding to the distance information in the display regions.

According to the aspect, a display color of the display regions in the display section is controlled according to the distance information. Therefore, it is possible to efficiently provide the user viewing the display with the information concerning the distance.

A control method for a display device according to still another aspect of the invention includes: controlling a display device including a display section configured to transmit an outside scene and display an image to be visually recognizable together with the outside scene; and acquiring distance information concerning a direction visually recognizable through the display section and controlling the display section on the basis of the acquired distance information to change visibility of the outside scene visually recognized through the display section.

According to the aspect, a user can obtain information concerning a distance on the basis of appearance of the outside scene transmitted through the display section. Therefore, it is possible to efficiently provide the user with the information concerning the distance. Since the control of the display section is performed on the basis of the distance information, for example, it is possible to reduce the number of times of operation by the user. It is possible to attain improvement of convenience.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
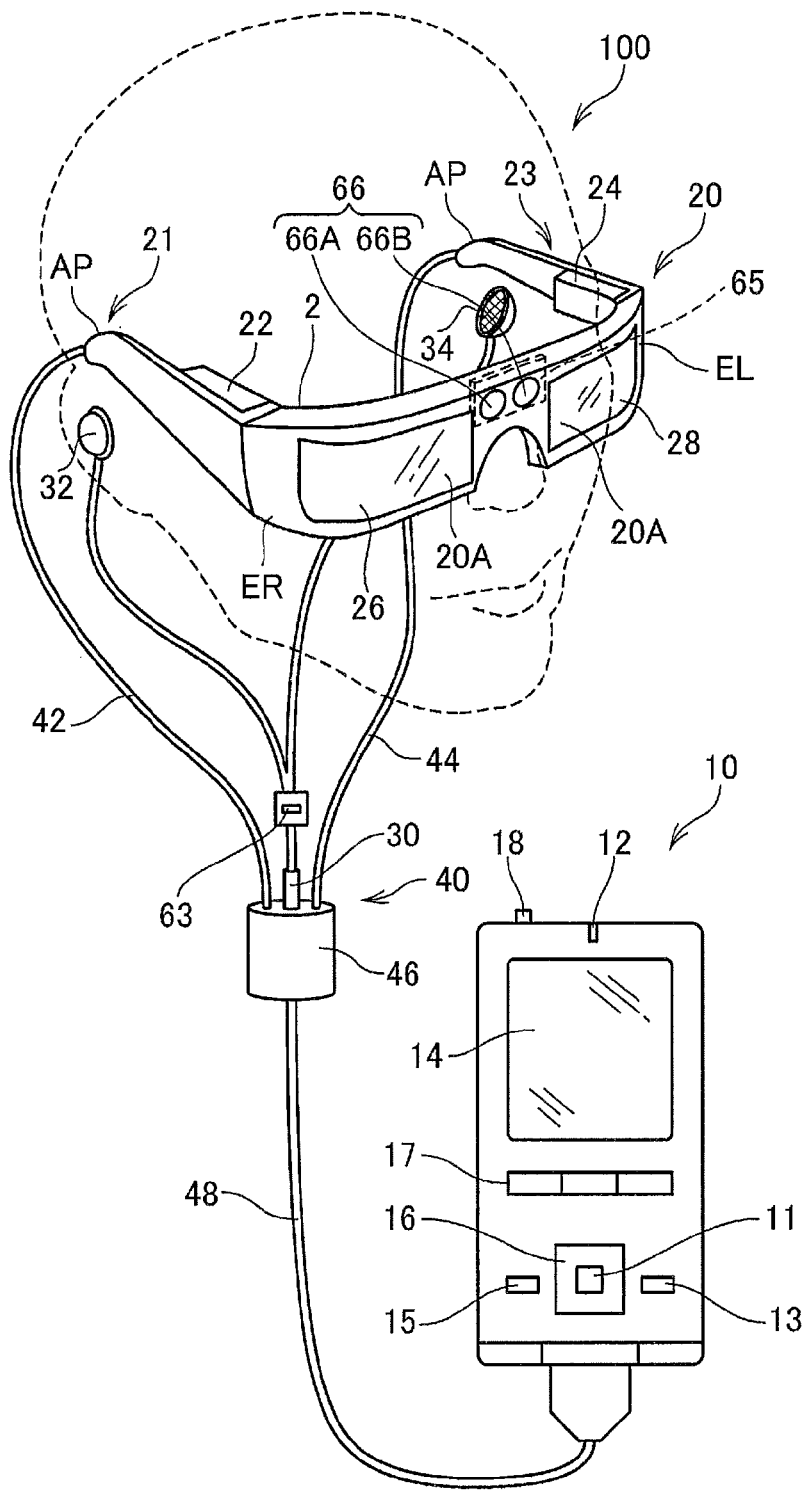
FIG. 1 is an explanatory diagram showing the exterior configuration of a head-mounted display device.

FIG. 1 is an explanatory diagram showing the exterior configuration of a head-mounted display device 100 (a display device) according to an embodiment applied with the invention.

The head-mounted display device 100 includes an image display section 20 (a display section) that causes a user to visually recognize a virtual image in a state in which the image display section 20 is worn on the head of the user and a control device 10 that controls the image display section 20. The control device 10 also functions as a controller with which the user operates the head-mounted display device 100.

The image display section 20 is a wearing body worn on the head of the user. In this embodiment, the image display section 20 includes a frame 2 (a main body) of an eyeglass shape.

The frame 2 includes a right holding section 21 and a left holding section 23. The right holding section 21 is a member provided to extend from an end portion ER, which is the other end of a right optical-image display section 26, to a position corresponding to the temporal region of the user when the user wears the image display section 20. Similarly, the left holding section 23 is a member provided to extend from an end portion EL, which is the other end of a left optical-image display section 28, to a position corresponding to the temporal region of the user when the user wears the image display section 20. The right holding section 21 is in contact with the right ear or the vicinity of the right ear in the head of the user and the left holding section 23 is in contact with the left ear of the user or the vicinity of the left ear. The right holding section 21 and the left holding section 23 hold the image display section 20 on the head of the user. The right holding section 21 and the left holding section 23 hold the image display section 20 on the head of the user like temples of eyeglasses.

In this embodiment, as an example of the main body, the frame 2 of the eyeglass shape is illustrated. The shape of the main body is not limited to the eyeglass shape and only has to be worn on and fixed to the head of the user. The main body more desirably has a shape worn across in front of the left and right eyes of the user. For example, besides the eyeglass shape explained above, the main body may have a shape like snow goggles that cover an upper part of the face of the user or may be a shape like a binocular disposed in front of the respective left and right eyes of the user.

In the frame 2, a right display driving section 22, a left display driving section 24, the right optical-image display section 26, the left optical-image display section 28, and a microphone 63 are provided. The right display driving section 22 and the left display driving section 24 are disposed on a side opposed to the head of the user when the user wears the image display section 20. The right optical-image display section 26 and the left optical-image display section 28 are respectively disposed to be located in front of the right and left eyes of the user when the user wears the image display section 20. One end of the right optical-image display section 26 and one end of the left optical-image display section 28 are coupled to each other in a position corresponding to the middle of the forehead of the user when the user wears the image display section 20. Note that the right display driving section 22 and the left display driving section 24 are collectively simply referred to as "display driving sections" as well. The right optical-image display section 26 and the left optical-image display section 28 are collectively simply referred to as "optical-image display sections" as well.

The display driving sections 22 and 24 include liquid crystal displays 241 and 242 (hereinafter referred to as "LCDs 241 and 242") and projection optical systems 251 and 252 explained below with reference to FIG. 2.

The right optical-image display section 26 and the left optical-image display section 28 include light guide plates 261 and 262 (FIG. 2) and dimming plates 20A. The light guide plates 261 and 262 are formed of light-transmissive resin or the like and guide image lights output by the display driving sections 22 and 24 to the eyes of the user. The dimming plates 20A are thin plate-like optical elements and are disposed to cover the front side of the image display section 20, which is a side opposite to the side of the eyes of the user. As the dimming plates 20A, various dimming plates such as a dimming plate having almost no light transmissivity, a dimming plate nearly transparent, a dimming plate that attenuates a light amount and transmits light, and a dimming plate that attenuates or reflects light having a specific wavelength can be used. By selecting optical characteristics (light transmittance, etc.) of the dimming plates 20A as appropriate, it is possible to adjust an amount of external light made incident on the right optical-image display section 26 and the left optical-image display section 28 from the outside and adjust easiness of visual recognition of a virtual image. In this embodiment, the dimming plates 20A at least having light transmissivity enough for enabling the user wearing the head-mounted display device 100 to visually recognize an outside scene are used. The dimming plates 20A protect the right light guide plate 261 and the left light guide plate 262 and suppress damage, adhesion of stain, and the like to the right light guide plate 261 and the left light guide plate 262.

The dimming plates 20A may be detachably attachable to the right optical-image display section 26 and the left optical-image display section 28. A plurality of kinds of dimming plates 20A may be replaceable and attachable. The dimming plates 20A may be omitted.

In the frame 2, a depth sensor unit 66 is provided. The depth sensor unit 66 (a distance detecting section) includes two cameras 66A and 66B (image pickup sections). The cameras 66A and 66B are disposed in a boundary portion between the right optical-image display section 26 and the left optical-image display section 28. In a state in which the user wears the image display section 20, the positions of the cameras 66A and 66B are substantially the middle of both the eyes of the user in the horizontal direction and are above both the eyes of the user in the vertical direction. The cameras 66A and 66B are digital cameras including an image pickup device such as a CCD or a CMOS and an image pickup lens and may be either a monocular camera or a stereo camera.

The cameras 66A and 66B pick up images of at least a part of an outside scene in a front side direction of the head-mounted display device 100, in other words, in a visual field direction of the user in a state in which the head-mounted display device 100 is mounted. The breadth of angles of view of the cameras 66A and 66B can be set as appropriate. However, the angles of view of the cameras 66A and 66B are desirably angles of view including an outside world that the user visually recognizes through the right optical-image display section 26 and the left optical-image display section 28. Further, image pickup ranges of the cameras 66A and 66B are more desirably set such that an image of the entire visual field of the user through the dimming plates 20A can be picked up. The angles of view of the cameras 66A and 66B may be set to overlap each other or may be set to partially overlap each other. An image of a part of a range in a visual line direction of the user only has to be picked up by both of the cameras 66A and 66B. Adjustment of the angles of view of the cameras 66A and 66B can be set as appropriate according to adjustment of optical axes of image pickup lenses (not shown in the figure), selection of angles of view of lenses, and the like.

A camera board 65 is incorporated in the inside of the frame 2. The camera board 65 is a board mounted with the cameras 66A and 66B. The camera board 65 is fixed on the inside of the frame 2 in the boundary portion between the right optical-image display section 26 and the left optical-image display section 28.

An illuminance sensor 164 (FIG. 3) is disposed in the frame 2. The illuminance sensor 164 is an ambient light sensor that detects a light amount of external light and outputs a detection value. The illuminance sensor 164 is disposed, for example, in the vicinity of the cameras 66A and 66B, receives the external light, and detects the light amount.

Figure 2:
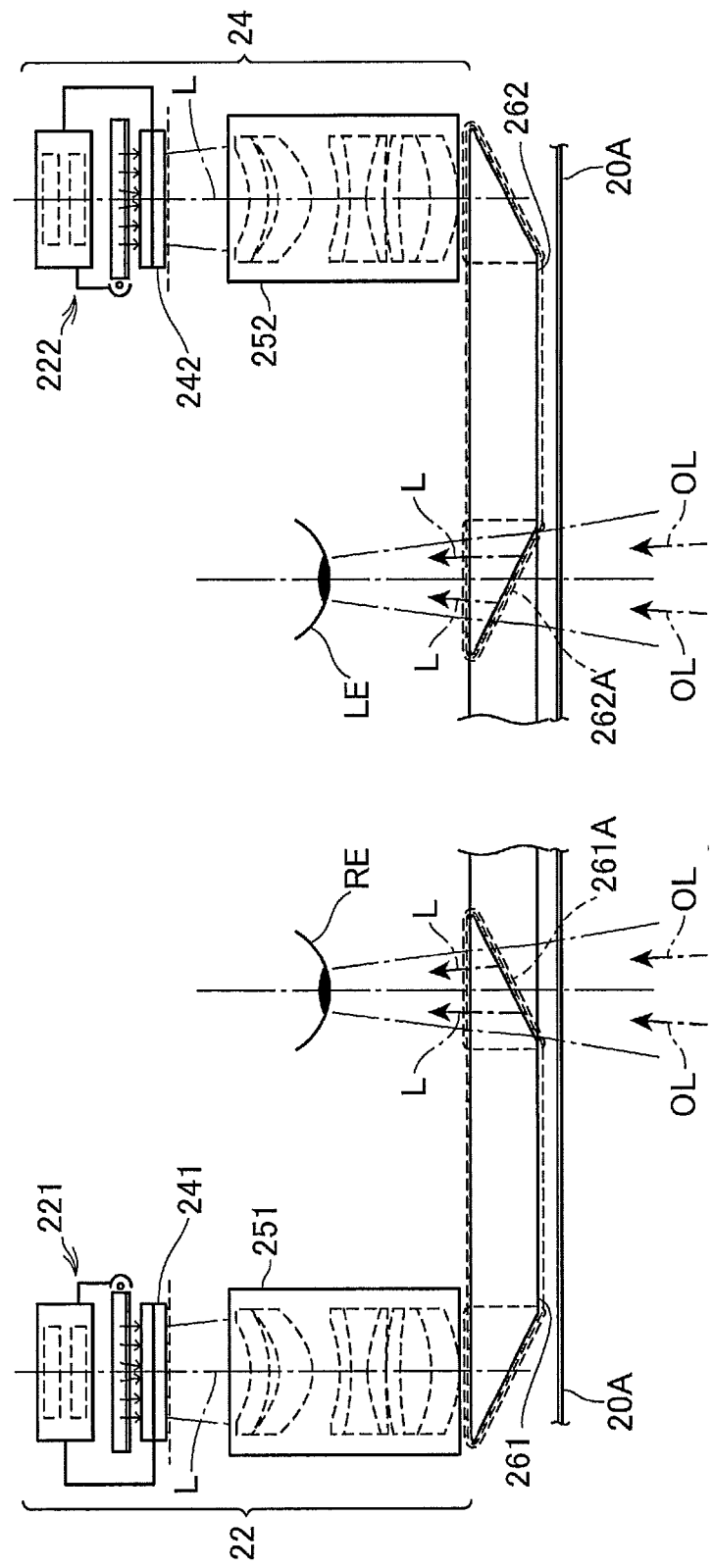
FIG. 2 is a diagram showing the configuration of an optical system of an image display section.

FIG. 2 is a main part plan view showing the configuration of an optical system included in the image display section 20. A left eye LE and a right eye RE of the user are shown in FIG. 2 for explanation.

The left display driving section 24 includes a left backlight 222 including a light source such as an LED and a diffuser. The left display driving section 24 includes the transmissive left LCD 242 of a transmission type disposed on an optical path of light diffused by the diffuser of the left backlight 222 and a left projection optical system 252 including a lens group and the like that guide image light L transmitted through the left LCD 242. The left LCD 242 is a transmissive liquid crystal panel on which a plurality of pixels are arranged in a matrix shape.

The left projection optical system 252 includes a collimate lens that changes the image light L emitted from the left LCD 242 to light beams in a parallel state. The image light L changed to the light beams in the parallel state by the collimate lens is made incident on the left light guide plate 262 (an optical element). The left light guide plate 262 is a prism on which a plurality of reflection surfaces for reflecting the image light L are formed. The image light L is guided to the left eye LE side through a plurality of times of reflection on the inside of the left light guide plate 262. On the left light guide plate 262, a half mirror 262A (a reflection surface) located in front of the left eye LE is formed.

The image light L reflected on the half mirror 262A is emitted from the left optical-image display section 28 toward the left eye LE. The image light L forms an image on the retina of the left eye LE and causes the user to visually recognize an image.

The right display driving section 22 is configured symmetrically to the left display driving section 24. The right display driving section 22 includes a right backlight 221 including a light source such as an LED and a diffuser. The right display driving section 22 includes the right LCD 241 of the transmission type disposed on an optical path of light diffused by the diffuser of the right backlight 221 and a right projection optical system 251 including a lens group and the like that guide the image light L transmitted through the right LCD 241. The right LCD 241 is a transmissive liquid crystal panel on which a plurality of pixels are arranged in a matrix shape.

The right projection optical system 251 includes a collimate lens that changes the image light L emitted from the right LCD 241 to light beams in a parallel state. The image light L changed to the light beams in the parallel state by the collimate lens is made incident on the right light guide plate 261 (an optical element). The right light guide plate 261 is a prism on which a plurality of reflection surfaces for reflecting the image light L are formed. The image light L is guided to the right eye RE side through a plurality of times of reflection on the inside of the right light guide plate 261. On the right light guide plate 261, a half mirror 261A (a reflection surface) located in front of the right eye RE is formed.

The image light L reflected on the half mirror 261A is emitted from the right optical-image display section 26 toward the right eye RE. The image light L forms an image on the retina of the right eye RE and causes the user to visually recognize an image.

The image light L reflected on the half mirror 261A and external light OL transmitted through the dimming plate 20A are made incident on the right eye RE of the user. The image light L reflected on the half mirror 262A and the external light OL transmitted through the dimming plate 20A are made incident on the left eye LE. In this way, the head-mounted display device 100 makes the image light L of the image processed on the inside and the external light OL incident on the eyes of the user to be placed one on top of the other. For the user, the outside scene is seen through the dimming plates 20A. The image formed by the image light L is visually recognized over the outside scene. In this way, the head-mounted display device 100 functions as a see-through type display device.

Note that the left projection optical system 252 and the left light guide plate 262 are collectively referred to as "left light guide section" as well. The right projection optical system 251 and the right light guide plate 261 are collectively referred to as "right light guide section" as well. The configuration of the right light guide section and the left light guide section is not limited to the example explained above. Any system can be used as long as a virtual image is formed in front of the eyes of the user using image light. For example, a diffraction grating may be used or a transreflective film may be used.

The image display section 20 (FIG. 1) is connected to the control device 10 via a connecting section 40. The connecting section 40 is a harness including a main body cord 48 connected to the control device 10, a right cord 42, a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The right cord 42, the left cord 44, and the main body cord 48 only have to be cords capable of transmitting digital data and can be configured by, for example, a metal cable or an optical fiber. The right cord 42 and the left cord 44 may be collected as one cord.

The coupling member 46 is provided at a branching point of the main body cord 48 and the right and left cords 42 and 44 and includes a jack for connecting an earphone plug 30. A right earphone 32 and a left earphone 34 extend from the earphone plug 30. The microphone 63 is provided in the vicinity of the earphone plug 30. Cords between the earphone plug 30 and the microphone 63 are collected as one cord. Cords branch from the microphone 63 and are respectively connected to the right earphone 32 and the left earphone 34.

For example, as shown in FIG. 1, the microphone 63 is disposed to direct a sound collecting section of the microphone 63 to the visual line direction of the user. The microphone 63 collects sound and outputs a sound signal. The microphone 63 may be, for example, a monaural microphone or a stereo microphone, may be a microphone having directivity, or may be a nondirectional microphone.

The image display section 20 and the control device 10 transmit various signals via the connecting section 40. Connectors (not shown in the figure), which fit with each other, are respectively provided at an end portion on the opposite side of the coupling member 46 of the main body cord 48 and in the control device 10. The control device 10 and the image display section 20 can be connected and disconnected by fitting and unfitting the connector of the main body cord 48 and the connector of the control device 10.

The control device 10 includes a box-shaped main body separate from a main body of the image display section 20 and controls the head-mounted display device 100. The control device 10 includes a determination key 11, a lighting section 12, a display switching key 13, a luminance switching key 15, a direction key 16, a menu key 17, and switches including a power switch 18. The control device 10 includes a track pad 14 operated by the user with a finger.

The determination key 11 detects depression operation and outputs a signal for determining content of the operation in the control device 10. The lighting section 12 includes a light source such as an LED (Light Emitting Diode) and notifies an operation state (e.g., ON/OFF of a power supply) of the head-mounted display device 100 according to a lighting state of the light source. The display switching key 13 outputs, according to the depression operation, for example, a signal for instructing switching of a display mode of an image.

The track pad 14 includes an operation surface for detecting contact operation and outputs an operation signal according to operation on the operation surface. A detection system on the operation surface is not limited. An electrostatic system, a pressure detection system, an optical system, and the like can be adopted. The luminance switching key 15 outputs, according to the depression operation, a signal for instructing an increase or a reduction of the luminance of the image display section 20. The direction key 16 outputs operation signals according to depression operation on the keys corresponding to the upward, downward, left, and right directions. The power switch 18 is a switch for switching power ON/OF of the head-mounted display device 100.

Figure 3:
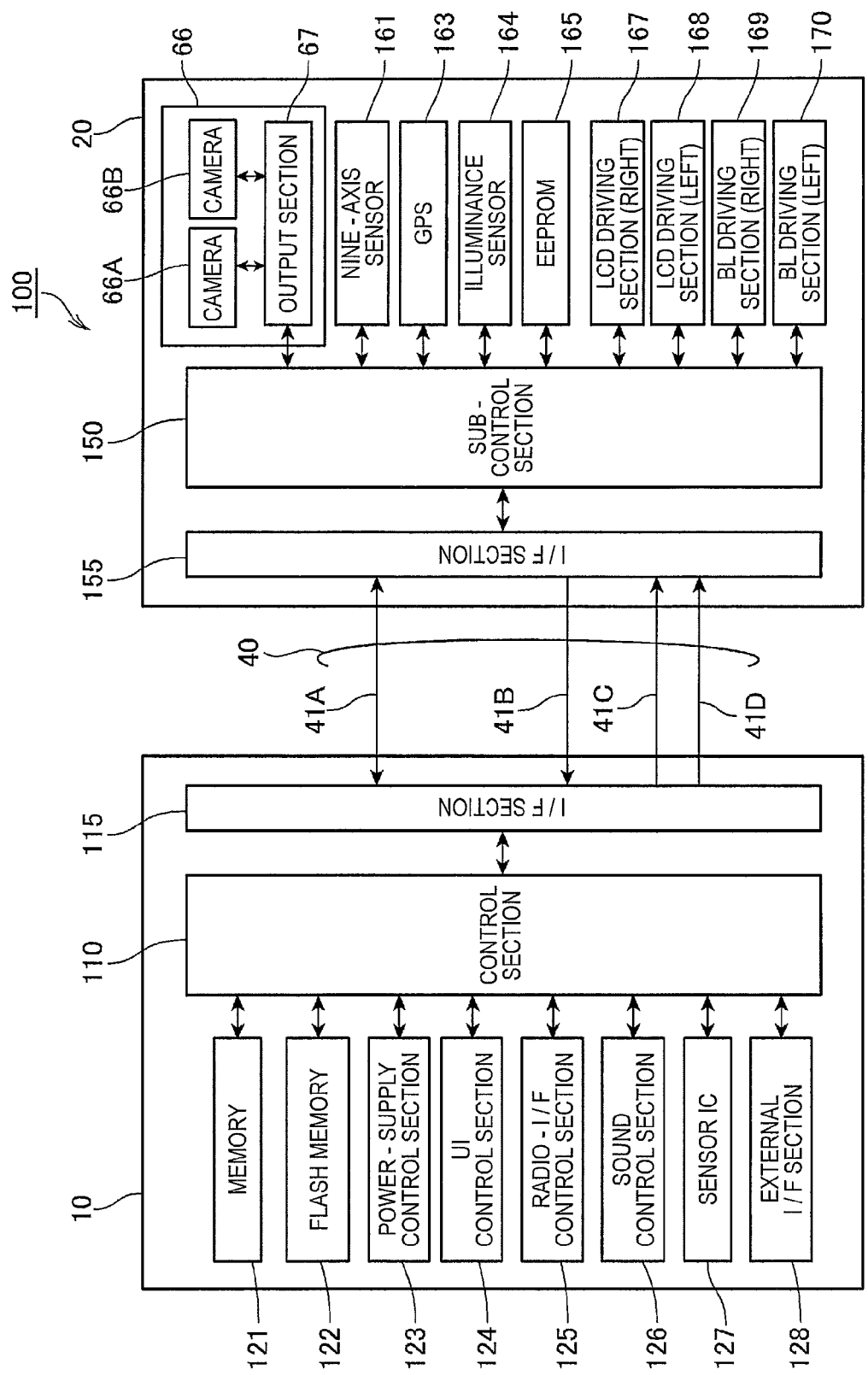
FIG. 3 is a functional block diagram of sections configuring the head-mounted display device.

FIG. 3 is a functional block diagram of the sections configuring the head-mounted display device 100.

The control device 10 includes a control section 110 (a second control section) that controls the control device 10 and the image display section 20. The control section 110 is configured by, for example, a microprocessor and is connected to a memory 121 that temporarily stores data and the like processed by the control section 110 and a flash memory 122 that stores, in a nonvolatile manner, data and the like processed by the control section 110. Both of the memory 121 and the flash memory 122 are configured by semiconductor elements and are connected to the control section 110 via a data bus.

A power-supply control section 123, a UI (user interface) control section 124, a radio-I/F (interface) control section 125, a sound control section 126, a sensor IC 127, and an external I/F (interface) section 128 are connected to the control section 110.

The head-mounted display device 100 includes a primary battery or a secondary battery as a power supply. The power-supply control section 123 is configured by an IC connected to the battery. The power-supply control section 123 performs detection of the residual capacity of the battery according to the control by the control section 110 and outputs, to the control section 110, data of detection values or data indicating that the residual capacity is equal to or smaller than a setting value.

The UI control section 124 is an IC to which the operation sections including the determination key 11, the display switching key 13, the luminance switching key 15, the direction key 16, and the menu key 17, the lighting section 12, and the track pad 14 are connected. The operation sections function as input sections. The lighting section 12 and the track pad 14 function as output sections. The operation sections and the lighting section 12 and the track pad 14 configure a user interface of the head-mounted display device 100. The UI control section 124 detects operation in the operation sections and outputs operation data corresponding to the operation to the control section 110. The UI control section 124 performs, according to the control by the control section 110, lighting/extinction of the lighting section 12 and display in the track pad 14.

The radio-I/F control section 125 is a control IC connected to a radio communication interface (not shown in the figure). The radio-I/F control section 125 executes communication by the radio communication interface according to the control by the control section 110. The radio communication interface included in the control device 10 executes radio data communication conforming to a standard such as a wireless LAN (WiFi (registered trademark)), Miracast (registered trademark), or Bluetooth (registered trademark).

The sound control section 126 is an IC connected to the right earphone 32, the left earphone 34, and the microphone 63 and including an A/D (analog/digital) converter and an amplifier. The sound control section 126 causes, on the basis of sound data input from the control section 110, the right earphone 32 and the left earphone 34 to output sound. The sound control section 126 generates sound data on the basis of sound collected by the microphone 63 and outputs the sound data to the control section 110.

The sensor IC 127 includes, for example, a three-axis acceleration sensor, a three-axis gyro sensor, and a three-axis terrestrial magnetism sensor. The sensor IC 127 is configured by one IC including the sensors. The sensor IC 127 executes detection according to the control by the control section 110 and outputs data indicating detection values of the sensors to the control section 110. The number and the types of the sensors included in the sensor IC 127 are not limited. The sensor IC 127 may include an illuminance sensor, a temperature sensor, and a pressure sensor.

The external I/F section 128 is an interface for connecting the head-mounted display device 100 to an external apparatus. For example, an interface corresponding to wired connection such as a USB interface, a micro USB interface, or an interface for a memory card can be used. The external I/F section 128 may be configured by a radio communication interface. Various external apparatuses that supply contents to the head-mounted display device 100 can be connected to the external I/F section 128. The external apparatuses can also be referred to as image supply apparatuses that supply images to the head-mounted display device 100. For example, a personal computer (PC), a cellular phone terminal, a portable game machine, and the like are used. Terminals connected to the right earphone 32, the left earphone 34, and the microphone 63 can also be provided in the external I/F section 128. In this case, an analog sound signal processed by the sound control section 126 is input and output via the external I/F section 128.

An I/F (interface) section 115 is connected to the control section 110. The I/F section 115 is an interface including a connector or the like connected to one end of the connecting section 40. The other end of the connecting section 40 is connected to an I/F section 155 of the image display section 20.

The control section 110 executes, via the connecting section 40, data communication with a sub-control section 150 included in the image display section 20.

The control section 110 executes computer programs stored in a ROM incorporated therein and controls the sections of the head-mounted display device 100. The control section 110 acquires the detection values of the sensors on the basis of data input from the sensor IC 127 and stores the detection values in the memory 121. At this point, the control section 110 adds and stores, in association with the detection values of the sensors, time stamp information indicating time when the detection values are acquired.

The control section 110 receives, via the connecting section 40, data indicating detection values of the sensors (the depth sensor unit 66, a nine-axis sensor 161, a GPS 163, and the illuminance sensor 164) included in the image display section 20. The control section 110 stores the received data in the memory 121. The data received by the control section 110 includes time stamp information added by the sub-control section 150. The control section 110 adds, in a form distinguishable from the time stamp information added by the sub-control section 150, the time stamp information added to the detection values of the sensor IC 127 as explained above, and stores the time stamp information in the memory 121. In the memory 121, the detection values of the sensors are stored in a data format added with the time stamp information as one of attributes of the data. The control section 110 may store the data of the detection values of the sensors in the flash memory 122.

The control section 110 receives data of contents from an external apparatus connected by the external I/F section 128 or the radio I/F control section 125 and stores the data in the flash memory 122. The data of the contents is data such as a text or an image to be displayed on the image display section 20 and may include data of sound to be output by the right earphone 32 and the left earphone 34. The control section 110 controls the head-mounted display device 100 and reproduces the contents. Specifically, the control section 110 transmits data for display of the contents to the sub-control section 150, causes the sub-control section 150 to execute display, outputs sound data of the contents to the sound control section 126, and causes the sound control section 126 to output sound. When the data of the contents received from the external apparatus includes data indicating a condition concerning reproduction, the control section 110 reproduces the contents according to this condition. For example, when a detection value of a sensor for a position, a tilt, or the like detected in the image display section 20 corresponds to the condition, the control section 110 causes the image display section 20 to display a text and an image corresponding to the detection value.

The image display section 20 includes the sub-control section 150 that executes communication with the control section 110 and controls the sections of the image display section 20. The sub-control section 150 is configured by, for example, a microprocessor and connected to the connecting section 40 by the I/F section 155. The sub-control section 150 executes data communication with the control section 110 via the connecting section 40.

Sensors such as the depth sensor unit 66, the nine-axis sensor 161, the GPS 163, and the illuminance sensor 164 are connected to the sub-control section 150.

The depth sensor unit 66 includes the cameras 66A and 66B that pick up images in the visual field direction of the user and output signals of image pickup results as explained above and an output section 67 (a depth-data generating section) that generates and outputs picked-up image data on the basis of the output signals of the cameras 66A and 66B. The output section 67 is mounted on the camera board 65 together with the cameras 66A and 66B.

The output section 67 is configured as, for example, an ASIC (Application Specific Integrated Circuit) and executes hardware processing on the signals output by the cameras 66A and 66B.

The output section 67 is capable of outputting a plurality of kinds of data on the basis of the images picked up by the cameras 66A and 66B.

The output section 67 can operate in a plurality of operation modes. The sub-control section 150 can control the output section 67 to execute switching of the operation modes. The types of the data output by the output section 67 correspond to the operation modes of the output section 67.

The operation modes of the output section 67 include an image output mode and a depth data output mode. In the image output mode, the output section 67 outputs the picked-up image data of the cameras 66A and 66B. In the image output mode, the output section 67 is capable of performing an operation for outputting the picked-up image data of one of the cameras 66A and 66B. The output section 67 may perform an operation for generating one picked-up image data from the picked-up images of both of the cameras 66A and 66B and outputting the picked-up image data. In the image output mode, the output section 67 may output 3D image data. In this case, the output section 67 outputs the picked-up image data of the camera 66A and the picked-up image data of the camera 66B in, for example, a side-by-side image format. The sub-control section 150 only has to be able to set and control, as appropriate, the operation of the output section 67 in the image output mode and specifications of image data output by the output section 67. For example, the sub-control section 150 may be able to set resolution, a color (monochrome binary, an 8-bit gray scale, a 24-bit full color, etc.), and a format (JPEG, RAW, etc.) of the image data.

In the depth data output mode, the output section 67 generates depth data from the picked-up images of the cameras 66A and 66B and outputs the depth data. The depth data (distance information) includes, for each of a plurality of positions in a distance detection target range, distance data indicating a distance. For example, like picked-up image data obtained by picking up images of the distance detection target range, the depth data includes a plurality of regions (equivalent to pixels) and distance data for each of the regions. The distance detection target range is at least a part of an overlapping range where an image pickup range of the camera 66A and an image pickup range of the camera 66B overlap. The plurality of regions are regions obtained by dividing the distance detection target range, for example, in a matrix shape. The number of the regions may correspond to resolution or the number of pixels of image pickup of the cameras 66A and 66B or may be smaller. For example, when the picked-up image data picked up by the cameras 66A and 66B is obtained in 2560×1920 pixels and the entire angle of view of the cameras 66A and 66B is the distance detection target range, the depth data may include distance data of 2560×1920 regions. The depth data may include distance data of a smaller number of regions. For example, the number of the regions may be set to 1280×960 or 640×480.

When image pickup surfaces of the cameras 66A and 66B are set as a reference, the distance data is data indicating a distance from the reference, for example, 8-bit digital data. The distance data may be data indicating an absolute distance conforming to an SI unit such as m (meter) or may be data of an absolute distance based on a standard different from the SI unit. Alternatively, the distance data may be data indicating relative distances of a plurality of positions within the distance detection target range. In this embodiment, the distance data is 8-bit digital data indicating an absolute distance not conforming to the SI unit.

In this case, the depth data includes 8-bit data respectively corresponding to regions of 1280×960, 640×480, or the like of a matrix shape. The depth data can be set as data of a file format same as a file format of image data.

The output section 67 can cyclically output the picked-up image data in the image output mode. The output section 67 may output moving image data of a predetermined frame rate (a frame frequency). The output section 67 can cyclically output the depth data in the depth data output mode. The depth data can be set as the data of the file format same as the file format of the image data as explained above. Therefore, the depth data may be output as the moving image data of the predetermined frame rate. The output section 67 may output the picked-up image data at a frame rate same as a frame rate of the depth data or may output the picked-up image data at a frame rate different from the frame rate of the depth data.

In this embodiment, in the depth data output mode, concerning a region of 640×480 dots, the output section 67 outputs the depth data including 8-bit distance data at a cycle of 15 fps (frame/second).

The output section 67 outputs, to the sub-control section 150, data corresponding to the operation mode set by the sub-control section 150. The sub-control section 150 transmits the data output by the output section 67 to the control section 110 according to necessity. The output section 67 may transmit and receive control data such as data for setting the operation mode to and from the sub-control section 150 and directly output the image data and the depth data to the control section 110 via the connecting section 40.

The nine-axis sensor 161 is an IC including a three-axis acceleration sensor, a three-axis gyro sensor, and a three-axis terrestrial magnetism sensor. The nine-axis sensor 161 is driven according to the control by the sub-control section 150 and outputs data indicating detection values of the incorporated sensors to the sub-control section 150. The illuminance sensor 164 is an IC of the ambient light sensor (ALS) as explained above or is an IC of a unit of a plurality of sensors including the ambient light sensor and peripheral circuits of the sensors. The illuminance sensor 164 is driven according to the control by the sub-control section 150 and outputs a detection value of a light amount to the sub-control section 150.

The GPS 163 receives a signal for position detection transmitted by a GPS satellite or a pseudo GPS transmitter (not shown in the figure) set indoors, calculates the present position of the image display section 20, and outputs the calculated data to the sub-control section 150. The GPS 163 may be configured to have only a function of a receiver that receives the signal for position detection. In this case, the sub-control section 150 only has to perform processing for calculating the present position on the basis of the data output by the GPS 163.

An EEPROM 165 stores, in a nonvolatile manner, data and the like concerning processing executed by the sub-control section 150.

An LCD driving section 167 that drives the right LCD 241 to perform rendering and an LCD driving section 168 that drives the left LCD 242 to perform rendering are connected to the sub-control section 150. The sub-control section 150 receives data of contents from the control section 110, generates display data for displaying a text and an image included in the received data, outputs the display data to the LCD driving sections 167 and 168, and causes the LCD driving sections 167 and 168 to execute display.

The sub-control section 150 is connected to a backlight driving section 169 that drives the right backlight 221 and a backlight driving section 170 that drives the left backlight 222. The sub-control section 150 outputs control data including timing data for PWM control to the backlight driving sections 169 and 170. The backlight driving sections 169 and 170 supply, on the basis of the control data input from the sub-control section 150, driving voltages and pulses to the right backlight 221 and the left backlight 222 and light the right backlight 221 and the left backlight 222.

The sub-control section 150 designates, according to the data output to the backlight driving section 169, pulse width or duty of a pulse output to the right backlight 221 by the backlight driving section 169. The duty indicates a ratio of an ON period and an OFF period of the pulse. Similarly, the sub-control section 150 designates, according to the data output to the backlight driving section 170, pulse width or duty of a pulse output to the left backlight 222 by the backlight driving section 170. The right backlight 221 and the left backlight 222 are solid-state light sources such as LEDs and can adjust brightness, that is, luminance of light emission according to PWM control. Therefore, it is possible to adjust, according to the control by the sub-control section 150, alight amount of the image light L (FIG. 2) made incident on the eyes of the user.

The sub-control section 150 can output different data respectively to the backlight driving section 169 and the backlight driving section 170 and individually adjust the luminance of the right backlight 221 and the luminance of the left backlight 222. The sub-control section 150 outputs data for designating the luminance of the right backlight 221 and the luminance of the left backlight 222 respectively to the backlight driving sections 169 and 170. The backlight driving sections 169 and 170 generate pulses corresponding to luminance values designated by the data input from the sub-control section 150 and output the pulses respectively to the right backlight 221 and the left backlight 222.

The connecting section 40 that connects the control section 110 and the sub-control section 150 includes a plurality of data buses including a control data bus 41A, an image data bus 41B, and display data buses 41C and 41D. The data buses can transmit data independently from one another. However, signal lines configuring the data buses may be physically divided or the data buses may be virtually or logically configured using a common signal line.

The control data bus 41A transmits the control data transmitted from the control section 110 to the sub-control section 150, the data of the detection values of the sensors transmitted to the control section 110 by the sub-control section 150, and the like. The image data bus 41B transmits the picked-up image data and the depth data of the depth sensor unit 66 from the sub-control section 150 to the control section 110. The display data bus 41C transmits data to be displayed by the right display driving section 22. The display data bus 41D transmits data to be displayed by the left display driving section 24.

Sampling cycles of a plurality of sensors including the depth sensor unit 66, the nine-axis sensor 161, the GPS 163, and the illuminance sensor 164 included in the image display section 20 are sometimes greatly different from one another. For example, it is conceivable that a sampling cycle (a sampling frequency) of an acceleration sensor of the nine-axis sensor 161 is 200 times/second or more. On the other hand, it is conceivable that a sampling cycle of the illuminance sensor 164 is lower and the illuminance sensor 164 is sufficiently useful at a sampling cycle of approximately 1 to 10 times/second (a 1000 to 100 ms cycle). The sub-control section 150 sets sampling cycles of these sensors. The sub-control section 150 acquires detection values of the sensors according to the set sampling cycles. The sub-control section 150 transmits data of the detection values sampled from the sensors to the control section 110 in a time division manner through the control data bus 41A.

Therefore, the control data bus 41A is not occupied for a long time in order to control a sensor having a low sampling cycle (in other words, having a low sampling frequency or a long sampling interval). Consequently, it is possible to reduce an overhead of the control data bus 41A and efficiently transmit detection values of a large number of sensors through the control data bus 41A. The sub-control section 150 incorporates a RAM (not shown in the figure) and, when detection values of the sensors are acquired, temporarily stores the detection values in the RAM. The sub-control section 150 adjusts transmission timing of data stored in the RAM and delivers the data to the control data bus 41A. Therefore, the operation of the sub-control section 150 is less easily affected by limitation of the sampling cycles of the sensors. It is possible to prevent a situation in which the processing by the sub-control section 150 is occupied for the control of the sensors.

Figure 4A:
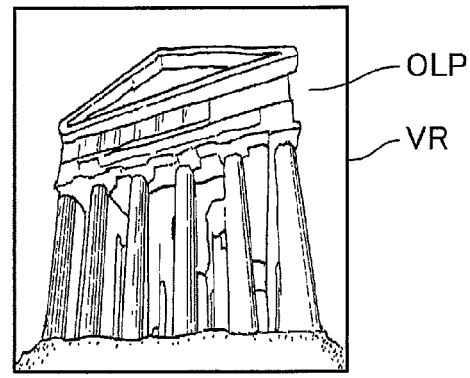
FIGS. 4A to 4D are diagrams showing display examples in the head-mounted display device.
Figure 4B:
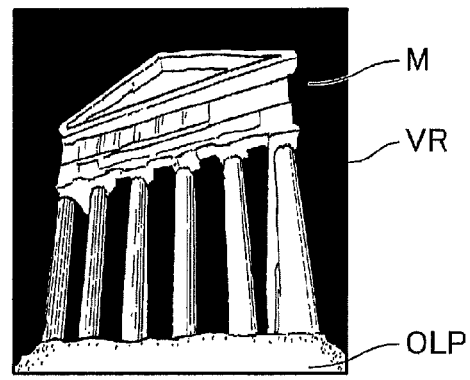
Figure 4C:
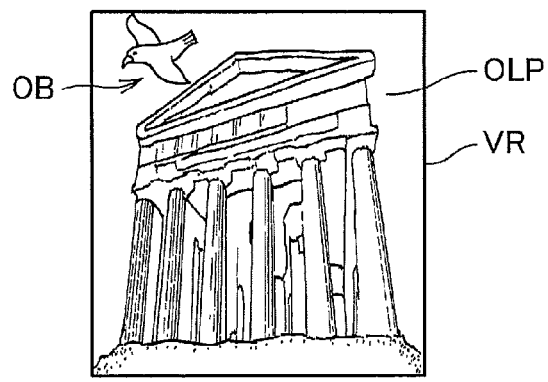
Figure 4D:
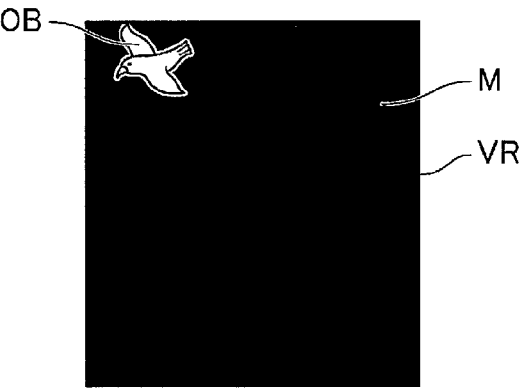

FIGS. 4A to 4D are diagrams showing display examples of images displayed by the head-mounted display device 100. FIG. 4A shows a visual field VR of the user wearing the head-mounted display device 100. FIG. 4B shows an example of mask processing based on depth data. FIG. 4C shows another example of the visual field VR of the user. FIG. 4D shows another example of the mask processing based on the depth data.

The head-mounted display device 100 performs mask processing for changing, on the basis of depth data output by the output section 67, visibility of an outside scene visually recognized through the right optical-image display section 26 and the left optical-image display section 28 (FIG. 1). In the mask processing, the head-mounted display device 100 adjusts a display color and luminance of display in a position overlapping an object or a scene seen as the outside scene. Consequently, it is possible to reduce visibility of a part of the object or the scene seen as the outside scene and, as a result, increase visibility of the other portions.

In the visual field VR shown in FIG. 4A, a building is seen as an outside scene OLP. In the example shown in FIG. 4B, the head-mounted display device 100 performs the mask processing such that an outside scene within a predetermined distance from the image display section 20 is visually recognized. In FIG. 4B, mask display M is performed such that visibility of a portion, the distance of which from the image display section 20 exceeds the predetermined distance. The mask display M is performed in a display color (gradation) for reducing visibility of the outside scene on specific pixels of the right LCD 241 and the left LCD 242.

The pixels on which the mask display M is performed are determined by the depth data output by the output section 67. However, the pixels on which the mask display M is performed need to correspond to the outside scene OLP seen in the visual field VR. Therefore, the head-mounted display device 100 uses position association data for associating positions (coordinates) in the picked-up image data of the cameras 66A and 66B and a position in the visual field VR of the user. The position association data is stored in the flash memory 122 or the EEPROM 165. The position association data may be generated on the basis of a result of calibration executed by the user after wearing the head-mounted display device 100.

Note that, when the output section 67 outputs depth data based on image pickup results of the two cameras 66A and 66B, it is possible to associate the depth data with display pixels of the image display section 20 according to the position association data.

Besides, two digital cameras not unitized like the depth sensor unit 66 may be configured to respectively output picked-up image data. In this case, the sub-control section 150 or the control section 110 may acquire the picked-up image data individually output by the two digital cameras, generate depth data, and associate the depth data and the display pixels of the image display section 20. For example, the control section 110 or the sub-control section 150 may generate the depth data from the picked-up image data of the two digital cameras using an operational expression for calculating depth data or an LUT (Look Up Table). For example, the control section 110 or the sub-control section 150 may associate the depth data and the display pixels of the image display section 20 with reference to an LUT stored by the head-mounted display device 100 in advance.

The head-mounted display device 100 may include display position association data for associating a position (a coordinate) in the right LCD 241 and a position (a coordinate) in the left LCD 242 and a position in the visual field VR of the user. The head-mounted display device 100 may include image pickup position association data for associating positions (coordinates) in the picked-up image data of the cameras 66A and 66B and the position (the coordinate) in the right LCD 241 and the position (the coordinate) in the left LCD 242. The display position association data and the image pickup position association data may be generated on the basis of, for example, the hardware configuration of the head-mounted display device 100 and stored in the flash memory 122 or may be generated by calibration. The control section 110 may calculate the position association data from the display position association data and the image pickup position association data. The control section 110 may calculate the position association data according to arithmetic processing performed using other data.

The control section 110 can specify, according to the depth data output by the output section 67, a distance in each of positions in the image pickup ranges of the cameras 66A and 66B. The control section 110 specifies a position within the predetermined distance and performs the mask display M on pixels of the right LCD 241 and the left LCD 242 corresponding to this position. According to this processing, as shown in FIG. 4B, the user visually recognizes only an outside scene close to the user in the visual field VR. Contrary to the example shown in FIG. 4B, visibility of the outside scene OLP in a position near from the user may be reduced by the mask display M. The visibility of the outside scene OLP, a distance to which from the user is outside a set range, may be reduced by the mask display M.

FIGS. 4C and 4D show the mask processing performed when the head-mounted display device 100 detects a change in a distance according to the depth data output by the output section 67.

In the example shown in FIG. 4C, the control section 110 acquires a plurality of depth data output by the output section 67 at different timings and detects, as the visibility of the outside scene OLP, a change in a distance in a range seen in the visual field VR. For example, the control section 110 can detect the change in the distance by storing the depth data acquired from the output section 67 in the memory 121 in the order of the acquisition and comparing distance data for each of dots of the depth data.

The control section 110 specifies a range in which the change in the distance is detected (equivalent to an object OB shown in FIG. 4C and, as shown in FIG. 4D, performs the mask display M on a portion excluding the specified range. In this example, a range excluding the object OB in which the change in the distance occurs in the outside scene OLP seen in the visual field VR is covered with the mask display M and visibility of the range decreases. Consequently, the object OB is conspicuously seen.

By performing the mask display M as shown in FIGS. 4B and 4D, it is possible to cause the user to gaze a specific portion of the visual field VR. It is possible to call attention and block unnecessary information. Note that, in the examples shown in FIGS. 4B and 4D, visibility is markedly reduced by the mask display M. However, a form of the mask display M is not limited to such examples. For example, in order to slightly reduce visibility, the luminance of the right LCD 241 and the left LCD 242 is set higher in the pixels on which the mask display M is performed than in the other pixels by one stage or a plurality of stages to perform the mask display M. A specific color allocated to the mask display M may be displayed on the pixels on which the mask display M is performed. The color allocated to the mask display M may be a chromatic color or may be an achromatic color including black, white, or gray.

Further, there are a method of performing dot perforation for erasing display in a region formed by a plurality of pixels including the pixels on which the mask display M is performed and a method of performing display to paint out the region with a single color. Alternatively, there are, for example, a method of blurring a displayed image according to image data processing, a method of applying sharpness processing to a displayed image, a method of performing edge enhancement processing, and a method of adjusting a gradation of image data.

Figure 5:
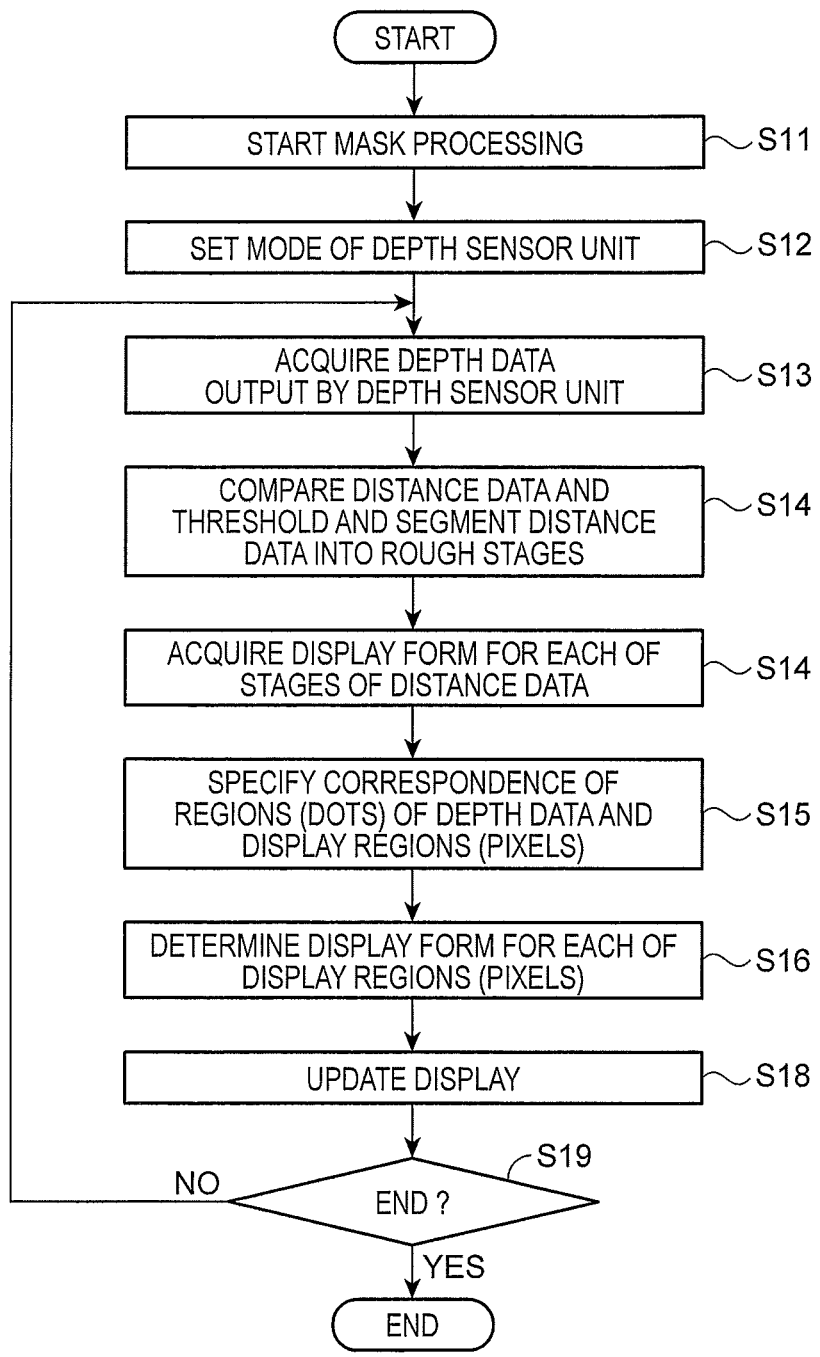
FIG. 5 is a flowchart for explaining the operation of the head-mounted display device.

FIG. 5 is a flowchart for explaining the operation of the head-mounted display device 100. An example of mask processing is shown in FIG. 5.

The control section 110 starts the mask processing according to, for example, operation on the control device 10 (step S11), transmits control data to the output section 67, and sets the operation mode of the depth sensor unit 66 (step S12). In step S12, the control section 110 sets the depth data output mode in which the output section 67 outputs depth data.

The control section 110 acquires the depth data output by the output section 67 (step S13) and segments distance data for each of dots included in the acquired depth data into rougher stages (step S14). In this embodiment, the output section 67 outputs depth data including 8-bit distance data. On the other hand, the control section 110 segments a distance into two or more states in the mask processing. Therefore, the control section 110 compares the distance data included in the depth data with a threshold stored in the memory 121 or the flash memory 122 in advance to segment the distance data into two or more stages.

The control section 110 acquires, from the flash memory 122, setting data for setting a display form for each of the stages of the distance data segmented in step S14 (step S15). In this embodiment, as shown in FIG. 4B, the control section 110 performs the mask display M in a region where the distance data is larger than the predetermined distance.

Subsequently, the control section 110 specifies, on the basis of, for example, the position association data, correspondence between the dots included in the depth data and the pixels of the right LCD 241 and the left LCD 242 (step S16).

The control section 110 determines a display form for each of the pixels of the right LCD 241 and the left LCD 242 on the basis of a result of the segmentation in step S14, the display form determined in step S15, and a correspondence relation of the display pixels specified in step S16 (step S17). For example, the control section 110 determines pixels on which the mask display M is performed in FIG. 4B and determines a display color or a gradation in the pixels.

The control section 110 transmits display data to the LCD driving sections 167 and 168 via the sub-control section 150 to cause the LCD driving sections 167 and 168 to update display in the right LCD 241 and the left LCD 242 (step S18).

The control section 110 determines whether to end the mask processing (step S19). If not to end the mask processing (NO in step S19), the control section 110 returns to step S13. When the end of the mask processing is instructed by operation of the control device 10 or when the head-mounted display device 100 is turned off by the power switch 18 of the control device 10, the control section 110 ends the mask processing (YES in step S19).

Figure 6:
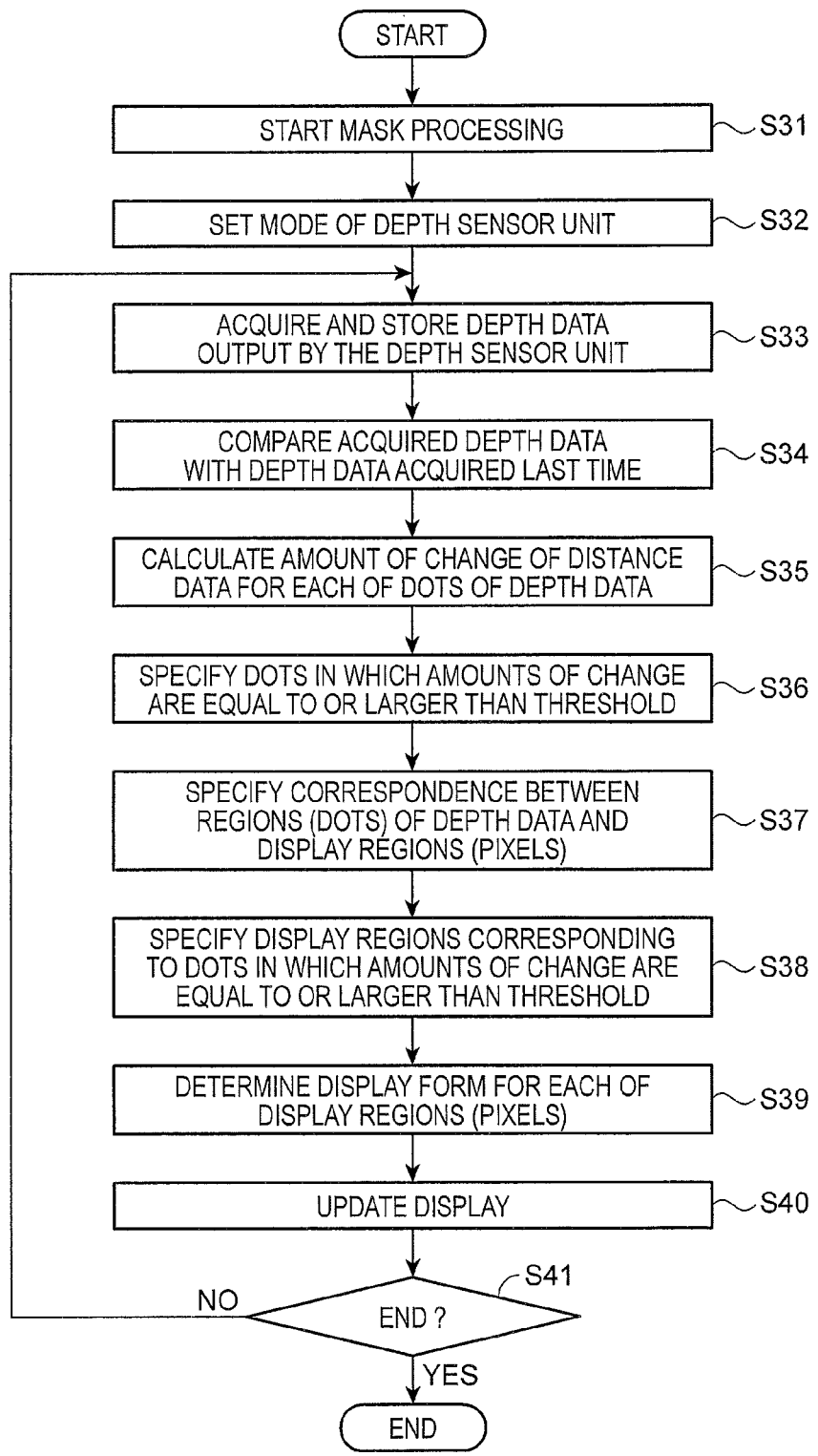
FIG. 6 is a flowchart for explaining the operation of the head-mounted display device.

FIG. 6 is a flowchart for explaining the operation of the head-mounted display device 100. In FIG. 6, an example of the mask processing based on a change in a distance is shown.

The control section 110 starts the mask processing according to, for example, operation on the control device 10 (step S31), transmits control data to the output section 67, and sets the operation mode of the depth sensor unit 66 to the depth data output mode (step S32).

The control section 110 acquires depth data output by the output section 67 and temporarily stores the depth data in the memory 121 (step S33). The control section 110 compares old depth data already acquired from the output section 67 and stored in the memory 121 and the depth data acquired from the output section 67 anew (step S34) and calculates an amount of change of distance data for each of dots of the depth data (step S35). The control section 110 specifies dots in which amounts of change of the distance data are equal to or larger than a threshold set in advance (step S36).

Subsequently, the control section 110 specifies, on the basis of, for example, the position association data, correspondence between the dots included in the depth data and the pixels of the right LCD 241 and the left LCD 242 (step S37). The control section 110 specifies correspondence between the dots, in which the amounts of change of the distance data are equal to or larger than the threshold, specified in step S36 and the pixels in the right LCD 241 and the left LCD 242 (step S38).

The control section 110 determines a display form of the pixels specified in step S38 (step S39). For example, the control section 110 determines pixels on which the mask display M is performed in FIG. 4D and determines a display color or a gradation in the pixels. The control section 110 transmits display data to the LCD driving sections 167 and 168 via the sub-control section 150 to cause the LCD driving sections 167 and 168 to update display in the right LCD 241 and the left LCD 242 (step S40).

The control section 110 determines whether to end the mask processing (step S41). If not ending the mask processing (NO in step S41), the control section 110 returns to step S13. When the end of the mask processing is instructed by operation of the control device 10 or when the head-mounted display device 100 is turned off by the power switch 18 of the control device 10, the control section 110 ends the mask processing (YES in step S41).

In the examples shown in FIGS. 4A to 5, the control section 110 executes the mask processing. However, the sub-control section 150 may executes the mask processing. That is, the control section 110 may transmit a command or control data for instructing execution of the mask processing to the sub-control section 150. The sub-control section 150 may control the processing shown in FIGS. 4A to 5. Alternatively, the control section 110 may perform a part of processing of the operation shown in FIGS. 4A to 5. The sub-control section 150 may perform the other processing.

The sub-control section 150 controls the sensors such as the depth sensor unit 66, the nine-axis sensor 161, the GPS 163, and the illuminance sensor 164, acquires detection values, and transmits the detection values to the control section 110. Therefore, compared with when the control section 110 controls the sensors, it is possible to greatly reduce a processing load on the control section 110 and an occupied time of the processing by the control section 110. When the sensors are connected to the control section 110, it is difficult to transmit detection values of the sensors having different sampling cycles through the same signal line. Therefore, the number of signal lines provided in the connecting section 40 increases according to the number of the sensors. Therefore, there is a concern about unfavorable situations in which, for example, the harness of the connecting section 40 is increased in thickness to deteriorate handling of the harness and the number of the sensors is limited. All the situations can be prevented and efficient processing can be realized when the sub-control section 150 acquires detection values of the sensors, performs adjustment of transmission timing via the control data bus 41A, and transmits the detection values of the plurality of sensors as in this embodiment. For example, the sub-control section 150 may preferentially perform, at timing set in advance, an operation for transmitting detection values of the sensors having short sampling cycles and transmit, in an idle time of the operation, detection values of the sensors having long sampling cycles.

As explained above, the head-mounted display device 100 in the embodiment applied with the invention includes the image display section 20 that transmits an outside scene and displays an image to enable the user to visually recognize the image together with the outside scene. The control section 110 acquires depth data concerning a direction visually recognizable through the image display section 20 and controls the image display section 20 on the basis of the acquired depth data. Consequently, the control section 110 changes visibility of the outside scene visually recognized through the image display section 20. Therefore, the user wearing the head-mounted display device 100 can obtain information concerning a distance on the basis of appearance of the outside scene transmitted through the image display section 20. Therefore, it is possible to efficiently provide the user with the information concerning the distance. Since the control of the image display section 20 is performed on the basis of the depth data, for example, it is possible to reduce the number of times of operation by the user. It is possible to attain improvement of convenience.

The image display section 20 displays an image in a display range formed by a plurality of display regions. The depth data includes distance data respectively corresponding to the display regions of the display range. The control section 110 controls display forms of the respective display regions on the basis of association of the depth data and the display regions to thereby change visibility of the outside scene. Therefore, it is possible to provide the information concerning the distance by changing the visibility of the outside scene in units of pixels forming the display regions of the right LCD 241 and the left LCD 242. It is possible to partially change the visibility of the outside scene with reference to the distance.

The control section 110 acquires depth data based on picked-up images of the cameras 66A and 66B, which are the plurality of image pickup sections, and performs association of the acquired depth data and the display pixels of the image display section 20. Therefore, it is possible to quickly perform association of the depth data and the display pixels. It is possible to easily and quickly execute the mask processing and the like. Further, it is also possible to attain improvement of accuracy of the mask processing.

The image display section 20 includes the depth sensor unit 66 that detects a distance to a target object located in a direction visually recognizable through the image display section 20 and outputs depth data. The control section 110 acquires the depth data output by the depth sensor unit 66. Therefore, it is possible to detect a distance to an object seen as the outside scene and change the visibility of the outside scene according to the distance.

The depth sensor unit 66 includes the plurality of cameras 66A and 66B and the output section 67 that generates depth data on the basis of picked-up image data of the cameras 66A and 66B and outputs the depth data. Therefore, it is possible to quickly generate the depth data using picked-up images.

The control section 110 can easily change the visibility of the outside scene by changing, in the image display section 20, luminance of display in a position corresponding to the direction in which the distance information is acquired.

The control section 110 performs the mask processing for reducing visibility of a part of the outside scene visually recognizable through the image display section 20 to be lower than visibility of other portions and reduces the visibility of the part of the outside scene on the basis of the depth data. The control section 110 may change, on the basis of the depth data, visibility of a portion corresponding to a distance set in advance in the outside scene. The control section 110 may change visibility of a portion where a distance specified by the depth data changes in the outside scene. For example, the control section 110 can change a display color or a display gradation in the display regions of the image display section 20 in the mask processing and easily and finely adjust the visibility of the outside scene.

The head-mounted display device 100 includes the frame 2 of a head wearing type worn on the head of the user. The image display section 20 is provided in the frame 2. It is possible to change the visibility of the outside scene on the basis of the depth data and efficiently provide the user with the information concerning the distance.

The control section 110 acquires depth data concerning a direction visually recognizable through the image display section 20 and association information for associating a plurality of display regions included in a display range and the depth data and causes, on the basis of the association information, the image display section 20 to display a display color corresponding to the depth data in the display regions. The control section 110 can efficiently provide the user viewing display with the information concerning the distance by controlling the display color in the image display section 20 in association with the depth data. This color may be a chromatic color or may be an achromatic color as explained above.

In this embodiment, the configuration in which the cameras 66A and 66B of the depth sensor unit 66 are fixedly provided in the frame 2 is explained as an example. However, the cameras 66A and 66B may be configured to be displaceable. This example is explained as a modification.

Modification

Figure 7:
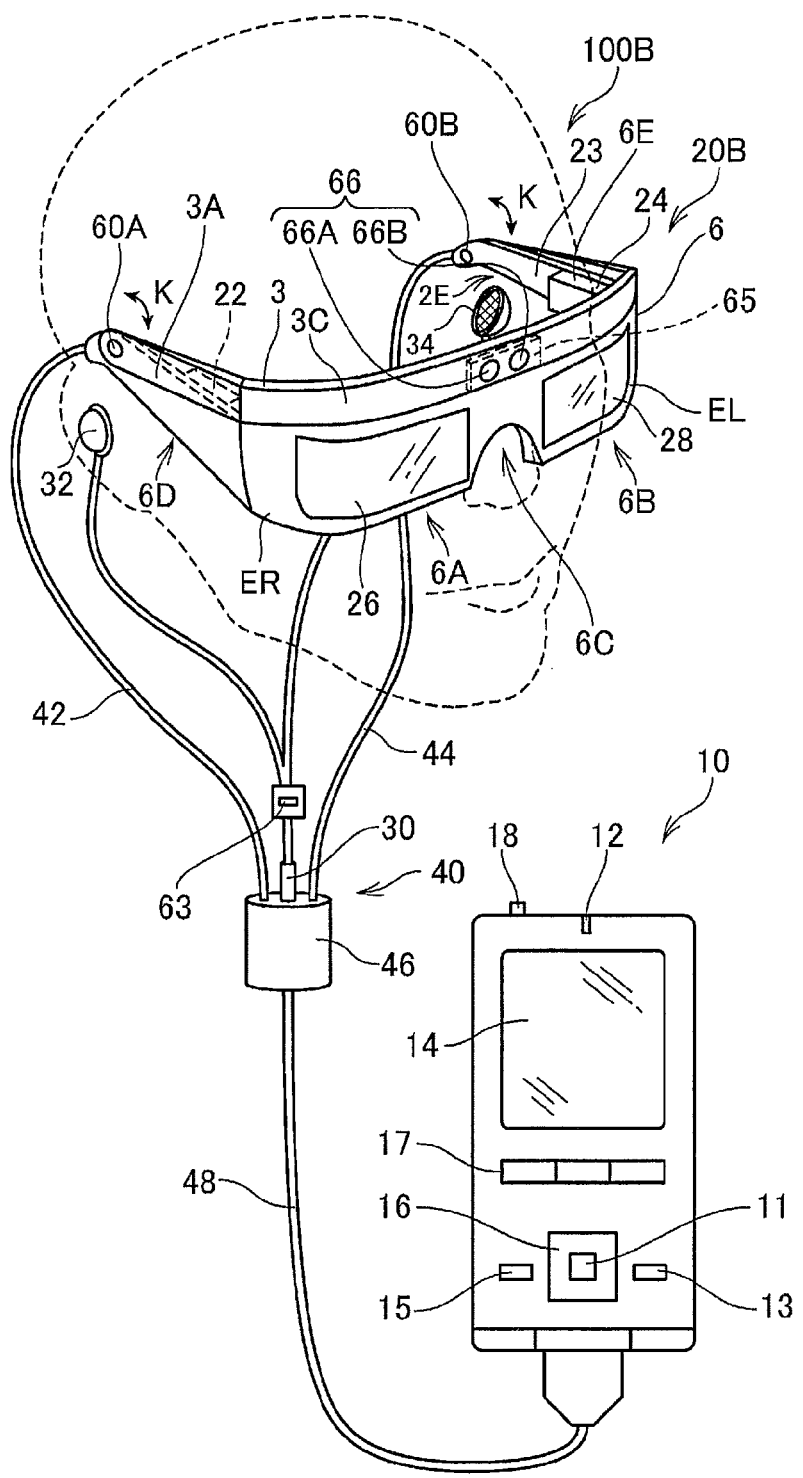
FIG. 7 is a diagram showing the exterior configuration of a head-mounted display device according to a modification.

FIG. 7 is a diagram showing the exterior configuration of a head-mounted display device 100B according to a modification of this embodiment.

The head-mounted display device 100B in the modification has a configuration in which an image display section 20B is connected to the control device 10 in the embodiment. Note that, in the image display section 20B, sections configured the same as the sections of the image display section 20 are denoted by the same reference numerals and signs and explanation of the sections is omitted.

Like the image display section 20 (FIG. 1), the image display section 20B is connected to the control device 10 via the connecting section 40. The image display section 20B and the control device 10 transmit various signals via the connecting section 40.

The image display section 20B is a wearing body worn on the head of the user. In this embodiment, the image display section 20B includes a frame 6 (a main body) of an eyeglass shape. The frame 6 includes a right section 6A located in front of the right eye of the user and a left section 6B located in front of the left eye. The right section 6A and the left section 6B are coupled by a bridge section 6C (a coupling section). The bridge section 6C couples the right section 6A and the left section 6B each other in a position corresponding to the middle of the forehead of the user when the user wears the image display section 20B.

The right section 6A and the left section 6B are respectively coupled to temple sections 6D and 6E. The temple sections 6D and 6E support the frame 6 on the head of the user like temples of eyeglasses. The right optical-image display section 26 is disposed in the right section 6A. The left optical-image display section 28 is disposed in the left section 6B. The right optical-image display section 26 and the left optical-image display section 28 are respectively located in front of the right and left eyes of the user when the user wears the image display section 20B.

The temple section 6D is provided to extend from the end portion ER, which is the other end of the right optical-image display section 26, to a position corresponding to the temporal region of the user when the user wears the image display section 20B. Similarly, the temple section 6E is provided to extend from the end portion EL, which is the other end of the left optical-image display section 28, to a position corresponding to the temporal region of the user when the user wears the image display section 20B. The temple section 6D is in contact with the right ear or the vicinity of the right ear in the head of the user and the temple section 6E is in contact with the left ear of the user or the vicinity of the left ear. The temple section 6D and the temple section 6E hold the image display section 20B on the head of the user.

A camera unit 3 is provided in the frame 6. The camera unit 3 includes a camera pedestal section 3C, in which the depth sensor unit 66 is disposed, and arm sections 3A and 3B that support the camera pedestal section 3C. The arm section 3A is rotatably coupled to the temple section 6D by a hinge 60A provided at a distal end portion AP of the temple section 6D. The arm section 3B is rotatably coupled to the temple section 6E by a hinge 60B provided at a distal end portion AP of the temple section 6E. Therefore, the camera unit 3 as a whole is capable of turning in a direction indicated by an arrow K in the figure, that is, up and down in a worn state. The camera unit 3 is in contact with the frame 6 at a lower end of a turning range. An upper end of the turning range of the camera unit 3 is determined by, for example, specifications of the hinges 60A and 60B.

The camera pedestal section 3C is a plate-like or bar-like member located to extend above the right section 6A, the left section 6B, and the bridge section 6C. The depth sensor unit 66 is embedded and set in a position equivalent to a part above the bridge section 6C. The camera board 65 is embedded and set in the camera pedestal section 3C. The cameras 66A and 66B mounted on the sensor board 65 are exposed in the camera pedestal section 3C.

In the configuration in which the camera unit 3 is provided to be displaceable with respect to the frame 6 in this way, the invention can also be applied in a configuration in which the display sensor unit 66 is mounted on the camera unit 3. In the configuration shown in FIG. 7, the camera unit 3 is movable with respect to the frame 6. Therefore, relative positions of the cameras 66A and 66B and the image display section 20 change. The correspondence between the positions (the coordinates) in the picked-up image data of the cameras 66A and 66B and the position in the visual field VR of the user changes. The correspondence between the positions (the coordinates) in the picked-up image data of the cameras 66A and 66B and the position (the coordinate) in the right LCD 241 and the position (the coordinate) in the left LCD 242 changes. Therefore, the control section 110 performs processing for associating, according to a relative position of the camera unit 3 to the frame 6, the positions (the coordinates) in the picked-up image data of the cameras 66A and 66B and the position in the visual field VR of the user. For example, when the position of the camera unit 3 with respect to the frame 6 changes, the control section 110 may perform calibration. Concerning a position change of the camera unit 3 with respect to the frame 6, the control section 110 may detect a direction and an amount of change of the position change. For example, a sensor that detects turning amounts in the hinges 60A and 60B can be used. In this case, the control sensor 110 only has to correct data for associating the positions (the coordinates) in the picked-up image data of the cameras 66A and 66B and the position in the visual field VR of the user on the basis of the detected direction of displacement and the detected amount of change.

Separately from the configuration shown in FIG. 7, the depth sensor unit 66 may be fixed to the main body fixedly worn on the head of the user. The display section including the right optical-image display section 26 and the left optical-image display section 28 may be movable with respect to the main body. In this case as well, as explained above, it is possible to perform the mask display M in a proper position by performing the processing for associating the positions (the coordinates) in the picked-up image data of the cameras 66A and 66B and the position in the visual field VR of the user.

Note that the invention is not limited to the configurations of the embodiment and the modification and can be carried out in various forms without departing from the spirit of the invention.

For example, instead of the image display sections 20 and 20B, an image display section of another system such as an image display section worn like a cap may be adopted. The image display section only has to include a display section that displays an image to correspond to the left eye of the user and a display section that displays an image to correspond to the right eye of the user. The display device according to the invention may be configured as, for example, a head mounted display mounted on a vehicle such as an automobile or an airplane. The display device according to the invention may be configured as, for example, a head mounted display incorporated in a body protector such as a helmet. In this case, a portion for positioning a position with respect to the body of the user and a portion positioned with respect to the portion can be a mounting section.

As the control device 10, a notebook computer, a tablet computer, or a desktop computer may be used. Alternatively, as the control device 10, portable electronic apparatuses including a game machine, a cellular phone, a smart phone, and a portable media player, other dedicated apparatuses, or the like may be used.

For example, the configuration for generating image light in the image display sections 20 and 20B may include an organic EL (Electro-Luminescence) display and an organic EL control section. As the configuration for generating image light, an LCOS (Liquid Crystal on Silicon: LCoS is a registered trademark), a digital micro mirror device, or the like can also be used.

As the optical system for guiding image light to the eyes of the user, it is possible to adopt an optical system including an optical member that transmits external light made incident toward the device from the outside and configured to make the light incident on the eyes of the user together with the image light. An optical member located in front of the eyes of the user and overlapping a part or the entire visual field of the user may be used. Further, a scanning-type optical system for scanning a laser beam or the like to form image light may be adopted. The optical system is not limited to an optical system for guiding the image light on the inside of an optical member and may be an optical system having only a function of refracting and/or reflecting the image light and guiding the image light toward the eyes of the user.

For example, it is also possible to apply the invention to a head mounted display of a laser retinal projection type. That is, an optical system may be adopted in which a light emitting section includes a laser beam source and an optical system for guiding a laser beam to the eyes of the user, makes the laser beam incident on the eyes of the user to scan the retina, and forms an image on the retina to thereby cause the user to visually recognize the image.

The invention can also be applied to a display device that adopts a scanning optical system including a MEMS mirror and makes use of a MEMS display technique. That is, the display device may include, as a light emitting section, a signal-light forming section, a scanning optical system including a MEMS mirror that scans light emitted by the signal-light forming section, and an optical member on which a virtual image is formed by the light scanned by the scanning optical system. In this configuration, the light emitted by the signal-light forming section is reflected by the MEMS mirror, made incident on the optical member, and guided in the optical member to reach a virtual-image forming surface. The MEMS mirror scans the light, whereby a virtual image is formed on the virtual-image forming surface. The user catches the virtual image with the eyes to recognize an image. An optical component in this case may be an optical component that guides light through a plurality of times of reflection like, for example, the right light guide plate 261 and the left light guide plate 262 in the embodiment. A half mirror surface may be used as the optical component.

At least a part of the functional blocks shown in FIG. 3 may be realized by hardware or may be realized by cooperation of the hardware and software. Therefore, the functional blocks are not limited to the configuration in which the independent hardware resources are disposed as shown in FIG. 3. The functional sections shown in FIG. 3 are not limited to an example of a configuration including a microprocessor and an IC and may be a configuration in which a plurality of functional sections are mounted on a larger integrated circuit or may be a form of an SoC (System-on-a-chip). The components formed in the control device 10 may be redundantly formed in the image display section 20.

The entire disclosure of Japanese Patent Application No. 2014-261553, filed Dec. 25, 2014 is expressly incorporated by reference herein.

What is claimed is:

1. A display device comprising:
a display section configured to transmit an outside scene and display an image to be visually recognizable together with the outside scene; and
a control section configured to acquire distance information concerning a direction visually recognizable through the display section and control the display section on the basis of the acquired distance information to change visibility of the outside scene visually recognized through the display section.

2. The display device according to claim 1, wherein
the display section displays an image in a display range formed by a plurality of display regions,
the distance information includes information corresponding to the respective display regions in the display range, and
the control section controls display forms of the respective display regions on the basis of association of the distance information and the display regions to thereby change visibility of the outside scene.

3. The display device according to claim 1, further comprising a plurality of image pickup sections, wherein
the control section acquires the distance information based on picked-up images of the plurality of image pickup sections and performs association of the acquired distance information and the display regions.

4. The display device according to claim 1, further comprising a distance detecting section configured to detect a distance to a target object located in a direction visually recognizable through the display section and output the distance information, wherein
the control section acquires the distance information output by the distance detecting section.

5. The display device according to claim 1, wherein the distance detecting section includes:
a plurality of image pickup sections; and
a distance-information generating section configured to generate the distance information on the basis of picked-up image data of the plurality of image pickup sections and output the distance information.

6. The display device according to claim 1, wherein the control section reduces the visibility of the outside scene by changing, in the display section, luminance of display in a position corresponding to the direction in which the distance information is acquired.

7. The display device according to claim 1, wherein the control section performs mask processing for reducing visibility of a part of the outside scene visually recognizable through the display section to be lower than visibility of other portions.

8. The display device according to claim 7, wherein the control section changes a display color or a display gradation in the display regions of the display section in the mask processing.

9. The display device according to claim 1, wherein the control section changes, on the basis of the distance information, visibility of a portion corresponding to a distance set in advance in the outside scene.

10. The display device according to claim 1, wherein the control section changes visibility of a portion where a distance specified by the distance information changes in the outside scene.

11. The display device according to claim 1, wherein the display device includes a main body of a head wearing type worn on the head of the user, and the display section is provided in the main body.

12. A display device comprising:
a display section configured to transmit an outside scene and display an image in a display range to be visually recognizable together with the outside scene; and
a control section configured to control the display of the display section, wherein
the control section acquires distance information concerning a direction visually recognizable through the display section and association information for associating a plurality of display regions included in the display range and the distance information and causes, on the basis of the association information, the display section to display a display color corresponding to the distance information in the display regions.

13. A control method for a display device comprising:
controlling a display device including a display section configured to transmit an outside scene and display an image to be visually recognizable together with the outside scene; and
acquiring distance information concerning a direction visually recognizable through the display section and controlling the display section on the basis of the acquired distance information to change visibility of the outside scene visually recognized through the display section.

* * * * *